United States Patent
Oh et al.

(10) Patent No.: US 12,057,271 B2
(45) Date of Patent: Aug. 6, 2024

(54) MULTILAYERED ELECTRONIC COMPONENT

(71) Applicant: SAMSUNG ELECTRO-MECHANICS CO., LTD., Suwon-si (KR)

(72) Inventors: Yu Hong Oh, Suwon-si (KR); Jun Oh Kim, Suwon-si (KR); Byung Kun Kim, Suwon-si (KR); Min Jung Cho, Suwon-si (KR); Won Mi Choi, Suwon-si (KR); Su Yeon Lee, Suwon-si (KR); Kyung Ryul Lee, Suwon-si (KR); Yun Sung Kang, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 108 days.

(21) Appl. No.: 17/841,156

(22) Filed: Jun. 15, 2022

(65) Prior Publication Data

US 2023/0207211 A1  Jun. 29, 2023

(30) Foreign Application Priority Data

Dec. 28, 2021 (KR) .......................... 10-2021-0189381

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/1209* (2013.01)

(58) Field of Classification Search
CPC ........ H01G 4/005; H01G 4/008; H01G 4/012; H01G 4/1209; H01G 4/30
(Continued)

(56) References Cited

U.S. PATENT DOCUMENTS 9,305,686 B2 * 4/2016 Kang ..................... H10N 30/50
2013/0321980 A1   12/2013 Suzuki et al.
(Continued)

FOREIGN PATENT DOCUMENTS

JP    5488725 B2   3/2014
JP    5892252 B2   3/2016
(Continued)

OTHER PUBLICATIONS

S. M. H. Rahman, et al., "50 mol% indium substituted BaTiO3: Characterization of structure and conductivity," SciVerse ScienceDirect, International Journal of Hydrogen Energy 37 (2012), pp. 7975-7982.

*Primary Examiner* — Arun Ramaswamy
(74) *Attorney, Agent, or Firm* — MORGAN, LEWIS & BOCKIUS LLP (57) ABSTRACT

A multilayer electronic component includes a body including a dielectric layer and an internal electrode alternately disposed with the dielectric layer interposed therebetween in a first direction; and an external electrode disposed on the body and connected to the internal electrode, wherein 0.46 to 1.08 at % is a range of an indium (In) content compared to nickel (Ni) and indium (In) contents in a surface layer portion of the internal electrode.

22 Claims, 6 Drawing Sheets

(51) Int. Cl.
*H01G 4/012* (2006.01)
*H01G 4/12* (2006.01)

(58) Field of Classification Search
USPC ............. 361/303, 301.4, 321.1, 321.4, 321.5
See application file for complete search history.

(56) References Cited

U.S. PATENT DOCUMENTS

| | | |
|---|---|---|
| 2015/0155098 A1 | 6/2015 | Yamaguchi et al. |
| 2016/0276102 A1* | 9/2016 | Suzuki ................... H01G 4/008 |
| 2016/0358713 A1 | 12/2016 | Doi et al. |
| 2017/0084392 A1* | 3/2017 | An ......................... H01G 4/008 |
| 2018/0204678 A1 | 7/2018 | Yamaguchi |
| 2019/0057813 A1 | 2/2019 | Okamoto |

FOREIGN PATENT DOCUMENTS

| | | | | |
|---|---|---|---|---|
| JP | 2017-5019 A | 1/2017 | | |
| JP | 2018-117051 A | 7/2018 | | |
| JP | 6624473 B2 | 12/2019 | | |
| KR | 2013031950 A * | 4/2013 | ............... | H01G 4/12 |
| KR | 10-2016-0085296 A | 7/2016 | | |

* cited by examiner

MULTILAYERED ELECTRONIC COMPONENT

CROSS-REFERENCE TO RELATED APPLICATION (S)

This application claims benefit of priority to Korean Patent Application No. 10-2021-0189381 filed on Dec. 28, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor, one of multilayer electronic components, may be a chip-type condenser which is mounted on a printed circuit board of any of various electronic products, such as an imaging device such as a liquid crystal display (LCD) or a plasma display panel (PDP), a computer, a smartphone or a mobile phone, to serve to charge or discharge electricity therein or therefrom.

The multilayer ceramic capacitor has a small size, implements high capacitance, may be easily mounted on a circuit board, and may thus be used as a component of various electronic devices. In recent years, as a component of the electronic device has a smaller size, there has been also increasing demand for the multilayer ceramic capacitor having a smaller size and higher capacitance.

In order for the multilayer capacitor to have the smaller size and the higher capacitance, required is technology in which each of an internal electrode and a dielectric layer has a reduced thickness.

However, as the dielectric layer has the reduced thickness, strength of an electrical field applied to each dielectric layer may become relatively high, thus making the multilayer capacitor have low reliability. In addition, in a case of a multilayer ceramic capacitor for electric use, reliability of the multilayer capacitor may be directly related to a safety accident, and it is thus emerging as an important issue that the capacitor has a long-term reliability characteristic in a harsh environment.

SUMMARY

An aspect of the present disclosure may provide a multilayer electronic component having improved reliability.

Another aspect of the present disclosure may provide a multilayer electronic component having improved mean time to failure (MTTF).

Another aspect of the present disclosure may provide a reliable multilayer electronic component having a smaller size and higher capacitance.

However, the aspects of the present disclosure are not limited to those described in the description above, and may be more readily understood in the description of exemplary embodiments of the present disclosure.

According to an aspect of the present disclosure, a multilayer electronic component may include: a body including a dielectric layer and an internal electrode alternately disposed with the dielectric layer interposed therebetween in a first direction; and an external electrode disposed on the body and connected to the internal electrode, wherein 0.46 to 1.08 at % is a range of an indium (In) content compared to nickel (Ni) and indium (In) contents in a surface layer portion of the internal electrode.

According to another aspect of the present disclosure, a multilayer electronic component may include: a body including a dielectric layer and an internal electrode alternately disposed with the dielectric layer interposed therebetween in a first direction, wherein in the dielectric layer, an indium (In) content is more than 0.3 and not more than 3.3 at % based on a titanium (Ti) content; and an external electrode disposed on the body and connected to the internal electrode.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may indicate a stack direction (or thickness T direction), a second direction may indicate a length L direction, and a third direction may indicate a width W direction.

Multilayer Ceramic Electronic Component

Figure 1:
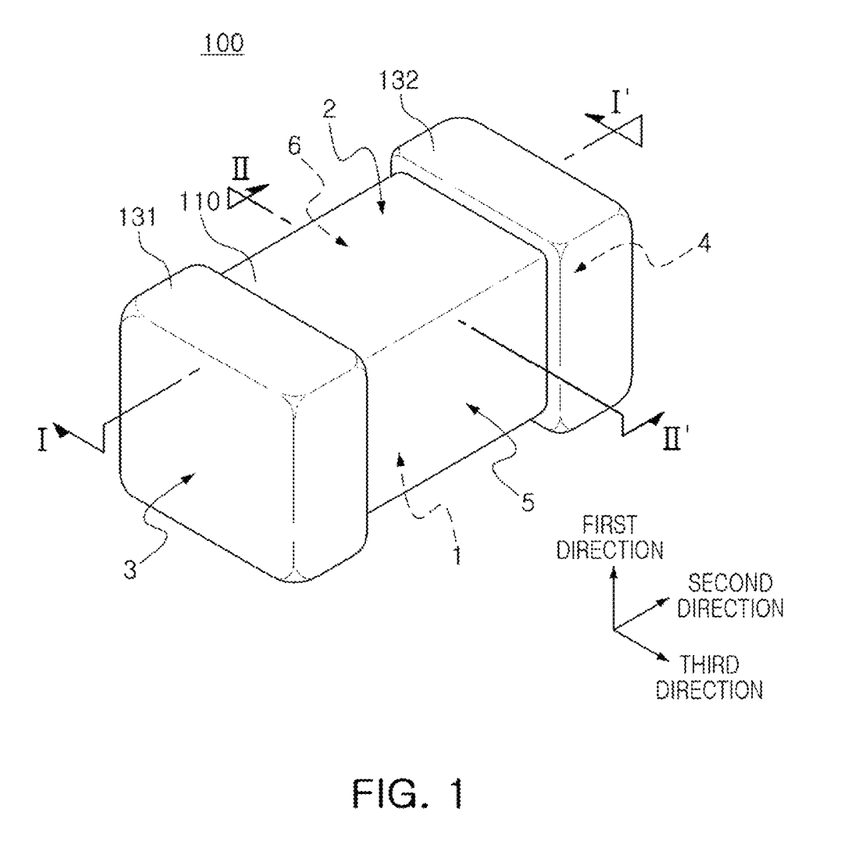
FIG. 1 is a perspective view schematically showing a multilayer electronic component according to an exemplary embodiment of the present disclosure.
Figure 2:
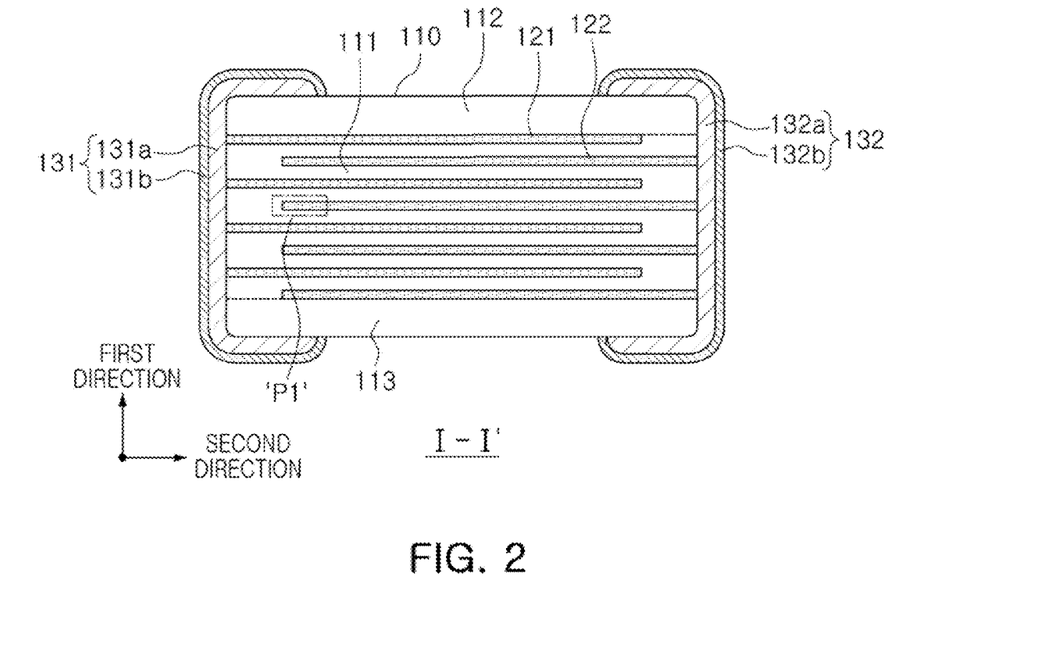
FIG. 2 is a schematic cross-sectional view taken along line I-I' of FIG. 1.
Figure 3:
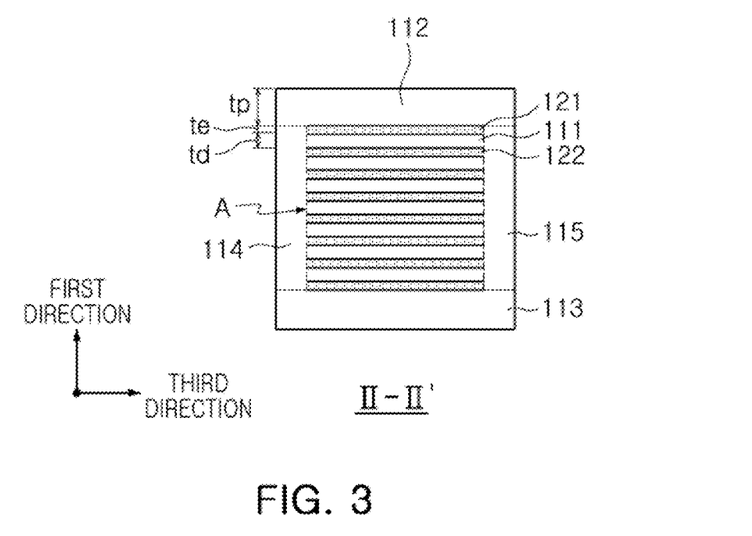
FIG. 3 is a schematic cross-sectional view taken along line II-II' of FIG. 1.
Figure 4:
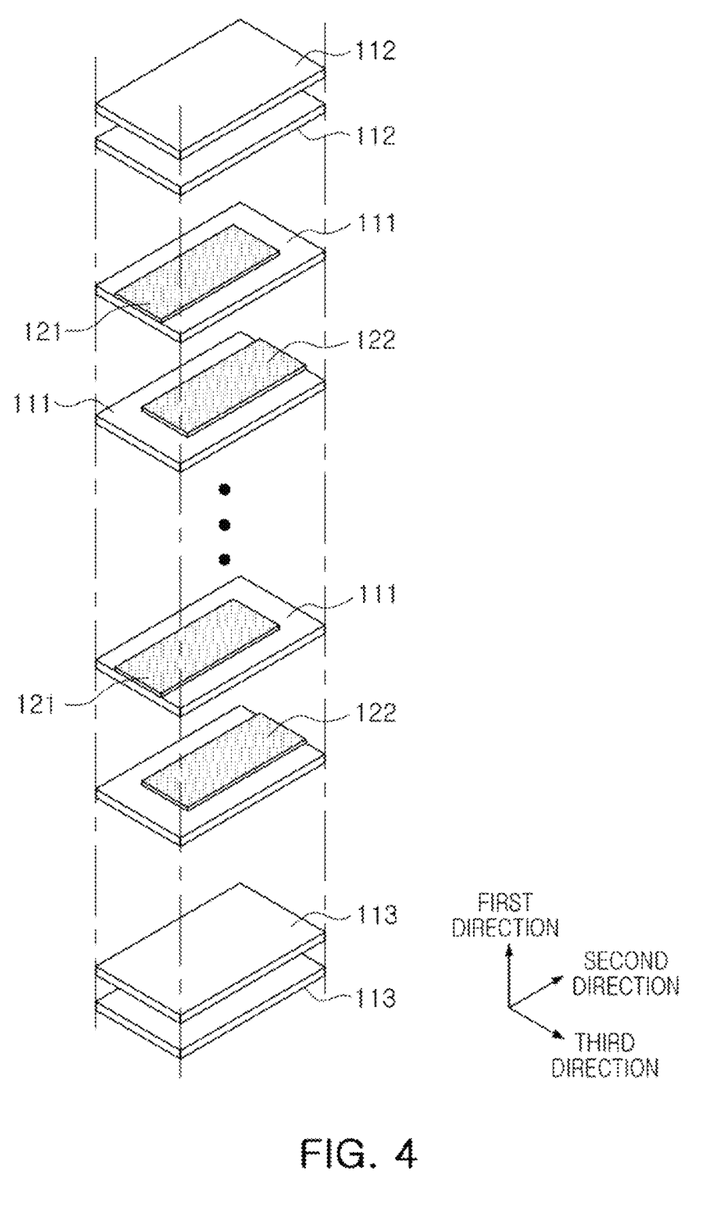
FIG. 4 is an exploded perspective view schematically showing an exploded body in which a dielectric layer and an internal electrode according to an exemplary embodiment of the present disclosure are stacked on each other.
Figure 5:
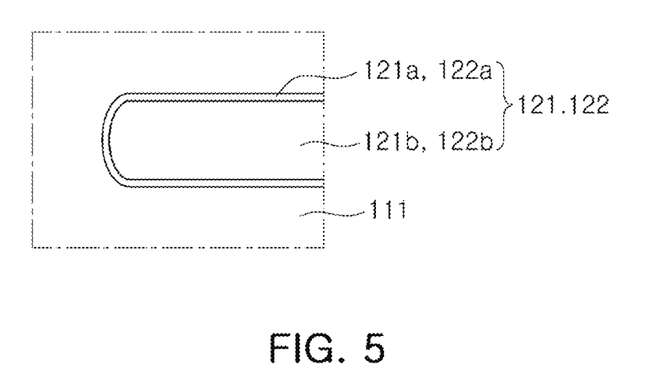
FIG. 5 is an enlarged view of a region P1 of FIG. 2.

FIG. 1 is a perspective view schematically showing a multilayer electronic component according to an exemplary embodiment of the present disclosure;

FIG. 2 is a schematic cross-sectional view taken along line I-I' of FIG. 1;

FIG. 3 is a schematic cross-sectional view taken along line II-II' of FIG. 1;

FIG. 4 is an exploded perspective view schematically showing an exploded body in which a dielectric layer and an internal electrode according to an exemplary embodiment of the present disclosure are stacked on each other; and FIG. 5 is an enlarged view of a region P1 of FIG. 2.

Hereinafter, the multilayer electronic component according to an exemplary embodiment of the present disclosure is described with reference to FIGS. 1 through 5.

A multilayer electronic component 100 according to an exemplary embodiment of the present disclosure may include: a body 110 including a dielectric layer 111 and an internal electrode 121 or 122 alternately disposed with the dielectric layer interposed therebetween in a first direction, and including an external electrode 131 or 132 disposed on the body and connected to the internal electrode.

The body 110 may include the dielectric layer 111 and the internal electrode 121 or 122, which are alternately stacked on each other.

The body 110 is not limited to a particular shape, and may have a hexahedral shape or a shape similar to the hexahedral shape, as shown in the drawings. The body 110 may not have the shape of a hexahedron having perfectly straight lines because a ceramic powder included in the body 110 is contracted in a process in which the body is sintered. However, the body 110 may have a substantially hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The internal electrode 121 or 122 and the dielectric layer 111 may be alternately disposed in the first direction.

The internal electrodes may include the first and second internal electrodes 121 and 122. The first and second internal electrodes 121 and 122 may be alternately disposed to oppose each other interposing the dielectric layer 111 configuring the body 110 therebetween, and may respectively be exposed to the third and fourth surfaces 3 and 4 of the body 110.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4.

Here, the first and second internal electrodes 121 and 122 may be electrically insulated from each other by the dielectric layer 111 interposed therebetween.

Referring to FIG. 4, the body 110 may be formed by alternately stacking a ceramic green sheet on which the first internal electrode 121 is printed and a ceramic green sheet on which the second internal electrode 122 is printed on each other and then sintering the same.

According to an exemplary embodiment of the present disclosure, 1.5 μm or less (or 100 nm to 1.5 μm) may be an average thickness te of the internal electrode. When more than 1.5 μm is the average thickness of the internal electrode, a size of a multilayer capacitor in a height direction may become excessively large, thus making it difficult for such a capacitor to be used in an electronic device. Meanwhile, as the internal electrode has a reduced thickness, it is advantageous for making the multilayer ceramic capacitor smaller, and a lower limit of the average thickness of the internal electrode may not be particularly limited. However, 100 nm may be the lower limit of the average thickness of the internal electrode which may be implemented in consideration of an average size of a nickel (Ni) particle included in a conductive paste.

A method of measuring the average thickness te of the internal electrode 121 or 122 may not be particularly limited, and may indicate the average thickness of the internal electrode measured in the first direction. Therefore, the average thickness of the internal electrode 121 or 122 may be measured by scanning an image of a cross section of the body 110 cut in the first-third (W-T) direction by using a scanning electron microscope (SEM).

For example, an average thickness value of the internal electrode may be measured by extracting any first or second internal electrode 121 or 122 from the scanned image of the cross section of the body 110 cut in the first-third (W-T) direction with respect to a center of the body in the second direction (length direction), by using the scanning electron microscope (SEM), and then measuring a thickness of the corresponding internal electrode at thirty equally spaced points in the length direction.

Meanwhile, the internal electrode 121 or 122 may include a surface layer portion 121a or 122a and a central portion 121b or 122b. In this specification, the central portion of the internal electrode may indicate a region thereof within +30% in the first direction, based on a center 1/2t of the internal electrode with respect to a thickness "t" thereof. In addition, the surface layer portion may indicate a region other than the central portion.

Accordingly, the surface layer portion may indicate a region within +20% from a surface of the internal electrode, based on the center 1/2t of the internal electrode with respect to the thickness "t" thereof. Here, the central portion and the surface layer portion may be defined based on the cross section of the body cut in the first-third (W-T) direction with respect to a 1/2 point of the body 110 in the second direction.

Figure 6:
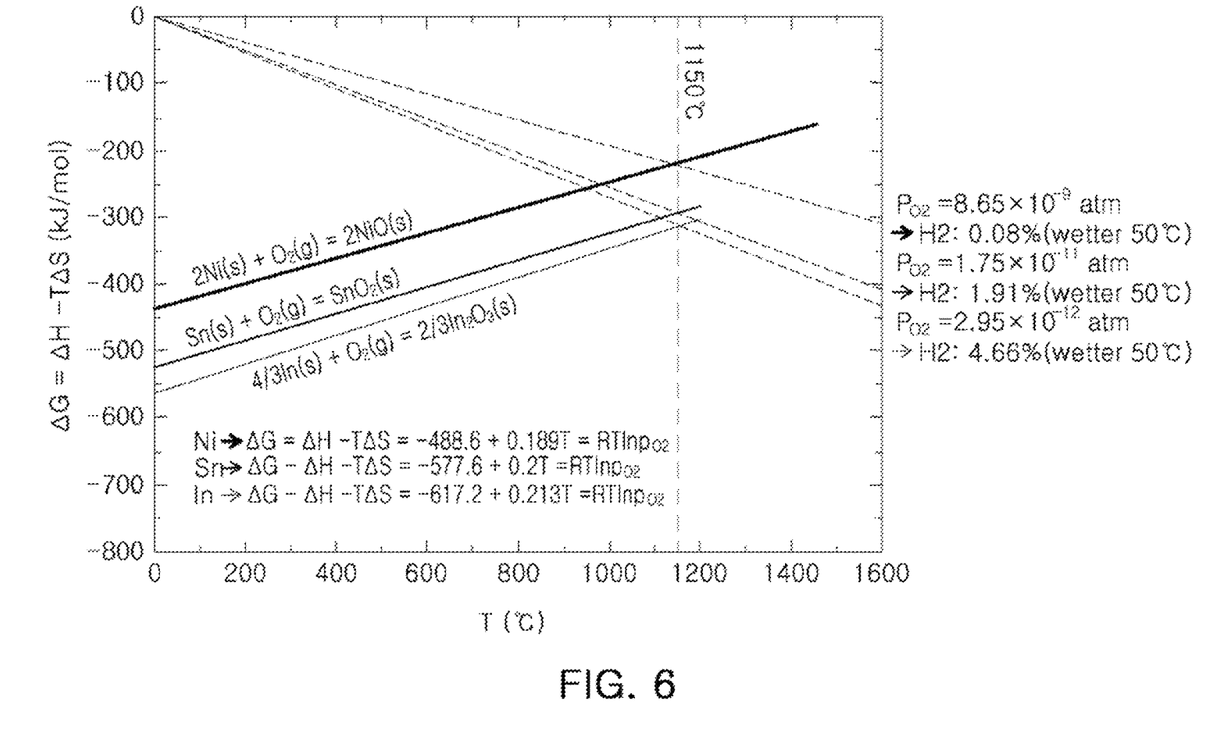
FIG. 6 shows an Ellingham diagram.

As may be seen from an Ellingham diagram shown in FIG. 6, indium (In) may be an element having a stronger oxidation tendency than nickel (Ni). When indium (In) is added as a material of the internal electrode and the internal electrode is then fired, one portion thereof may be oxidized and diffused to the dielectric layer to be replaced by a titanium (Ti) site such as $BaTiO_3$, and another portion thereof may not be oxidized and form an alloy with nickel (Ni) remaining in the internal electrode. In addition, the one portion of indium (In) diffused from the internal electrode to the dielectric layer may be trapped at an interface between the dielectric layer and the internal electrode, thus forming a region in which indium (In) is concentrated in the surface layer portion of the internal electrode.

Accordingly, as a result of intensive researches, the present inventors find that it is possible to secure excellent capacitance and reliability of the capacitor by controlling an indium (In) content in the surface layer portion of the internal electrode layer to a specific range when an indium (In) amount is adjusted compared to a nickel (Ni) amount added to the conductive paste and the internal electrode is then fired under an appropriate oxygen partial pressure condition, and complete the present disclosure.

In detail, in the present disclosure, 0.46 to 1.08 at % may be a range of the indium (In) content compared to nickel (Ni) and indium (In) contents (e.g., a sum of nickel (Ni) and indium (In) contents) in the surface layer portion 121a or 122a of the internal electrode. As such, it is possible to improve a bonding strength of the interface between the dielectric layer and the internal electrode by disposing the surface layer portion 121a or 122a, which is a region in which indium (In) is concentrated to an appropriate concentration rather than the central portion 121b or 122b, in the internal electrode 121 or 122. In addition, the surface layer portion may contribute to securing the excellent capacitance and reliability of the capacitor by functioning as a kind of semiconductor barrier that prevents electrons from being moved from the internal electrode to the dielectric layer or vice versa.

When less than 0.46 at % is a range of the indium (In) content compared to the nickel (Ni) and indium (In) contents in the surface layer portion of the internal electrode, the indium (In) content in the surface layer portion may be insufficient. In this case, it may be difficult to expect that the bonding strength of the interface is improved as described above or the surface layer portion functions as the semiconductor barrier, which results in insufficient reliability of the capacitor. On the other hand, more than 1.08 at % is a range of the indium (In) content compared to the nickel (Ni) and indium (In) contents in the surface layer portion of the internal electrode, the indium (In) content in the surface layer portion may be excessive. In this case, the barrier preventing schottky occurring from the interface may have a reduced height, which may result in a break down voltage (BDV) and a lower reliability of the capacitor. In some embodiments, the indium (In) content may be more than 0.46 and less than 1.08 at %, or 0.67 to 0.98 at % based on the nickel (Ni) and indium (In) contents.

As an example of a method of measuring the indium (In) content compared to the nickel (Ni) and indium (In) contents in the surface layer portion of the internal electrode, it is possible to measure the same, based on a cross section of the body cut in the first-third (W-T) direction with respect to the 1/2 point of the body 110 in the second direction. In detail, the above indium (In) content may be measured by obtaining an average value of the indium (In) content compared to the nickel (Ni) and indium (In) contents at each of five equally spaced points corresponding to the surface layer portion of the internal electrode, based on quantitative analysis of the indium (In) and nickel (Ni) components using an energy dispersive spectroscopy (EDS).

Meanwhile, although the present disclosure is not particularly limited, as a result of repeated researches, the present inventors find that it is possible to contribute to securing the capacitance and reliability of the multilayer electronic component by controlling the indium (In) content in the appropriate range even in the central region, which is a region other than the above-described surface layer portion of the internal electrode.

Accordingly, according to an exemplary embodiment of the present disclosure, 0.41 to 0.62 at % may be a range of the indium (In) content compared to the nickel (Ni) and indium (In) contents in the central portion of the internal electrode.

When the indium (In) added to the internal electrode is not oxidized and remains on the internal electrode to form a nickel (Ni)-indium (In) alloy, the energy and surface tension of a grain boundary of nickel (Ni) may be reduced, thereby improving the smoothness and connectivity of the electrode. When the smoothness of the electrode is improved in this way, the concentration of an electric field may be dispersed, and the capacitor may thus also be expected to have the improved reliability.

Therefore, when less than 0.41 at % is a range of the indium (In) content compared to the nickel (Ni) and indium (In) contents in the central portion of the internal electrode, it may be difficult to expect that the energy and surface tension of the grain boundary of nickel (Ni) is reduced, which may y cause difficulty in securing the reliability of the capacitor.

On the other hand, when more than 0.62 at % is a range of the indium (In) content compared to the nickel (Ni) and indium (In) contents in the central portion of the internal electrode, the electrode of nickel (Ni)-indium (In) alloy may have an excessively low melting point, and balling of the electrode may thus rapidly proceed. As a result, the electrode may have lower smoothness and connectivity, and it may thus be difficult to secure the capacitance and reliability of the capacitor. In some embodiments, the indium (In) content may be more than 0.41 and less than 0.62 at %, or more than 0.41 and less than 0.57 at % based on the nickel (Ni) and indium (In) contents.

Meanwhile, as an example of a method of measuring the indium (In) content compared to the nickel (Ni) and indium (In) contents in the central portion of the internal electrode, it is possible to measure the same, based on the cross section of the body cut in the first-third (W-T) direction with respect to the 1/2 point of the body 110 in the second direction. In detail, the above indium (In) content may be measured by obtaining an average value of the indium (In) content compared to the nickel (Ni) and indium (In) contents at each of five equally spaced points belonging to the central portion of the internal electrode, based on the quantitative analysis of the indium (In) and nickel (Ni) components using the energy dispersive spectroscopy (EDS).

Meanwhile, according to an exemplary embodiment of the present disclosure, the indium (In) content in the central portion of the internal electrode may be less than the indium (In) content in the surface layer portion. As described above, indium (In) which has the strong oxidation tendency while the internal electrode is fired, may be diffused from the interface between the internal electrode and the dielectric layer to the dielectric layer, thus replacing the titanium (Ti) site such as BaTio$_3$. Due to this diffusion tendency, indium (In) may be trapped at the interface between the dielectric layer and the internal electrode, and the indium (In) content in the surface layer portion of the internal electrode may be inevitably greater than the indium (In) content in the central portion of the internal electrode.

For example, Y<X in which "X" indicates the indium (In) content (at %) compared to the indium (In) and nickel (Ni) contents of the internal electrode, measured at a point spaced apart from the interface of the internal electrode and the dielectric layer by 3 nm in the first direction, and "Y" indicates the indium (In) content (at %) compared to the indium (In) and nickel (Ni) contents measured at a center of the internal electrode in the first direction.

In addition, although the present disclosure is not particularly limited, according to an exemplary embodiment of the present disclosure, the dielectric layer may include indium (In). As described above, the indium (In) added as the material of the internal electrode may be diffused to the dielectric layer during a process in which the internal electrode is fired, and the dielectric layer may thus also include a predetermined amount of indium (In).

In addition, according to an exemplary embodiment of the present disclosure, 0.3 to 3.3 at % may be a range of the indium (In) content compared to a titanium (Ti) content in the dielectric layer. As a result of repeated researches, the present inventors find that, in addition to the above-described distribution of indium (In) in the internal electrode, it is possible to control the amount of indium (In) diffused during the process in which the internal electrode is fired, and the indium (In) content in the dielectric layer is a factor also contributing to the capacitance and reliability of the multilayer electronic component.

During the process in which the internal electrode is fired, +trivalent indium may be replaced by the titanium (Ti) site of the dielectric and function as an acceptor, thus contributing to the improvement of the reliability of the multilayer electronic component. The indium (In) content in the dielectric layer may thus be controlled to a range of 0.3 at % or more in order to secure the above-described effect. Meanwhile, when more than 3.3 at % is a range of the indium (In) content in the dielectric layer, a grain growth of $BaTiO_3$ may be excessively suppressed, thus making the capacitor have insufficient capacitance. In some embodiments, the indium (In) content in the dielectric layer may be more than 0.3 and not more than 3.3 at %, 0.7 to 3.3 at %, more than 0.7 and less than 3.3 at %, or 1.3 to 2.5 at % based on the titanium (Ti) content.

Meanwhile, as an example of a method of measuring the indium (In) content compared to the titanium (Ti) content in the dielectric layer, it is possible to measure the same, based on the cross section of the body cut in the first-third (W-T) direction with respect to the 1/2 point of the body 110 in the second direction. In detail, the above indium (In) content may be measured by obtaining an average value of the indium (In) content compared to the titanium (Ti) content at each of five equally spaced points corresponding to the dielectric layer, based on a quantitative analysis of the indium (In) and titanium (Ti) components using an energy dispersive spectroscopy (EDS).

In addition, as a result of repeated researches, the present inventors confirm that there is a correlation between the distribution of the indium (In) in the dielectric layer and internal electrode and a performance of the multilayer electronic component.

In detail, although the present disclosure is not particularly limited, according to an exemplary embodiment of the present disclosure, the indium (In) content in the dielectric layer may be greater than the indium (In) content in the internal electrode. That is, even when indium (In) is added as the material of the internal electrode, indium (In) is an element having the strong oxidation tendency, and the oxidation of indium (In) may thus actively occur while the process in which the internal electrode is fired, and the indium (In) content in the dielectric layer may thus be greater than the indium (In) content in the internal electrode. By satisfying this condition, the above-described function of indium in the dielectric layer may act more actively as the acceptor, and the capacitor may thus secure more excellent capacitance and reliability.

Therefore, according to an exemplary embodiment of the present disclosure, the indium (In) content in the dielectric layer may be greater than the indium (In) content in the central portion of the internal electrode, or the indium (In) content in the dielectric layer may be greater than the indium (In) content in the surface layer portion of the internal electrode and the indium (In) content in the central portion of the internal electrode.

In addition, according to an exemplary embodiment of the present disclosure, Y<Z in which "Y" indicates the indium (In) content compared to the indium (In) and nickel (Ni) contents measured at the center of the internal electrode in the first direction, and "Z" indicates the indium (In) content compared to the titanium (Ti) content measured at a center of the dielectric layer in the first direction.

Alternatively, according to an exemplary embodiment of the present disclosure, X<Z in which "X" indicates the indium (In) content compared to the indium (In) and nickel (Ni) contents of the internal electrode, measured at the point spaced apart from the interface of (the internal electrode and) the dielectric layer by 3 nm in the first direction, and "Z" indicates the indium (In) content compared to the titanium (Ti) content measured at the center of the dielectric layer in the first direction. For another example, the multilayer electronic component according to an exemplary embodiment of the present disclosure may satisfy Y<X<Z.

The plurality of dielectric layers 111 included in the body 110 may already be sintered, and adjacent dielectric layers 111 may thus be integrated with each other, thus making it difficult to confirm a boundary therebetween without using the scanning electron microscope (SEM).

According to an exemplary embodiment of the present disclosure, a raw material used for forming the dielectric layer 111 is not particularly limited as long as the capacitor obtains the sufficient capacitance from the raw material. For example, the dielectric layer may use a material such as a barium titanate-based material, a lead composite perovskite-based material or a strontium titanate-based material. The barium titanate-based material may include a barium titanate ($BaTiO_3$)-based ceramic powder, and this ceramic powder may be, for example, $BaTiO_3$ or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ and the like, in which calcium (Ca), zirconium (Zr) or the like is partially dissolved in $BaTiO_3$.

The material of the dielectric layer 111 may be prepared by adding various ceramic additives, organic solvents, binders, dispersants and the like, to a powder such as the barium titanate ($BaTiO_3$) powder or the like, according to an object of the present disclosure.

According to an exemplary embodiment of the present disclosure, 200 nm to 4 µm may be a range of an average thickness td of the dielectric layer 111. When less than 200 nm is the average thickness td of the dielectric layer 111, a distance between the dielectric layer and the internal electrode may become excessively close, thus increasing a rate in which a short-circuit occurs. On the other hand, when more than 4 µm is the average thickness td of the dielectric layer 111, the capacitor may have lower capacitance.

The average thickness td of the dielectric layer 111 may indicate an average thickness of the dielectric layer 111 disposed between the first and second internal electrodes 121 and 122, measured in the first direction.

The average thickness of the dielectric layer 111 may be measured by scanning an image of the cross section of the body 110, cut in the first-third (W-T) direction, by using the scanning electron microscope (SEM).

For example, an average thickness value of the dielectric layer may be measured by extracting any dielectric layer from the scanned image of the cross section of the body 110 cut in the first-third (W-T) direction with respect to the center of the body in the second direction, by using the scanning electron microscope (SEM), and then measuring the thickness of the corresponding dielectric layer at thirty equally spaced points in the length direction.

The thickness of the dielectric layer, measured at the thirty equally spaced points, may be measured in a capacitance formation portion A, which is a region where the first and second internal electrodes 121 and 122 overlap each other.

The body 110 may include the capacitance formation portion A disposed in the body 110, including the first and second internal electrodes 121 and 122 disposed to oppose each other interposing the dielectric layer 111 therebetween, and forming the capacitance of the capacitor, and cover portions 112 and 113 disposed on the upper and lower portions of the capacitance formation portion A.

In addition, the capacitance formation portion A may be a portion contributing to forming the capacitance of the capacitor, and may be formed by repeatedly stacking the plurality of first and second internal electrodes 121 and 122 interposing the dielectric layer 111 therebetween.

The upper cover portion 112 and the lower cover portion 113 may be formed by stacking one dielectric layer or two or more dielectric layers on the upper and lower surfaces of the capacitance formation portion A in the thickness direction, respectively, and may basically serve to prevent damage to the internal electrodes, caused by physical or chemical stress.

The upper and lower cover portions 112 and 113 may include no internal electrode and may include the same material as the dielectric layer 111.

That is, the upper and lower cover portions 112 and 113 may include the ceramic material such as the barium titanate ($BaTiO_3$)-based ceramic material.

Meanwhile, a thickness of the cover portion 112 or 113 may not need to be particularly limited. However, the cover portion 112 or 113 may have a thickness tp of 20 μm or less in order for the multilayer electronic component to more easily have a smaller size and higher capacitance.

In addition, margin portions 114 and 115 may each be disposed on a side of the capacitance formation portion A.

The margin portions 114 and 115 may include the margin portion 114 disposed on the sixth surface 6 of the body 110 and the margin portion 115 disposed on the fifth surface 5 of the body 110. That is, the margin portions 114 and 115 may be disposed on both sides of the ceramic body 110 in the width direction.

As shown in FIG. 3, the margin portions 114 and 115 may indicate a region between both ends of the first and second internal electrodes 121 and 122 and a boundary surface of the body 110, based on the cross section of the body 110 cut in the width-thickness (W-T) direction.

The margin portion 114 or 115 may basically serve to prevent the damage to the internal electrode, caused by the physical or chemical stress.

The margin portion 114 or 115 may be formed by forming the internal electrode by applying the conductive paste on a ceramic green sheet except a portion where the margin portion is to be positioned.

Alternatively, in order to suppress a step difference occurring due to the internal electrode 121 or 122, the margin portion 114 or 115 may be formed by stacking the internal electrodes on each other, then cutting the internal electrodes to be exposed to the fifth and sixth surfaces 5 and 6 of the body, and then stacking one dielectric layer or two or more dielectric layers on both the sides of the capacitance formation portion A in the width direction.

The external electrodes 131 and 132 may be disposed on the body 110 and may respectively be connected to the internal electrodes 121 and 122.

As shown in FIG. 2, the capacitor may include the first and second external electrodes 131 and 132 respectively disposed on the third and fourth surfaces 3 and 4 of the body 110, and respectively connected to the first and second internal electrodes 121 and 122.

This exemplary embodiment describes that the multilayer electronic component 100 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity, such as a metal, may use a specific material determined in consideration of electrical characteristics, structural stability or the like, and may have a multilayer structure.

For example, the external electrodes 131 and 132 may each include electrode layers 131a and 132a disposed on the body 110 and plating layers 131b and 132b respectively formed on the electrode layers 131a and 132a.

As a more specific example of the electrode layer 131a or 132a, the electrode layer 131a or 132a may be a fired electrode including a conductive metal and glass, or a resin-based electrode including the conductive metal and a resin.

In addition, the electrode layer 131a or 132a may be made by sequentially forming the fired electrode and the resin-based electrode on the body. In addition, the electrode layer 131a or 132a may be formed by transferring a sheet including the conductive metal to the body or by transferring the sheet including the conductive metal to the fired electrode.

The conductive metal included in the electrode layer 131a or 132a may use a material having excellent electrical conductivity, and is not particularly limited. For example, the conductive metal may be at least one of nickel (Ni), copper (Cu) and an alloy thereof.

The plating layer 131b or 132b may serve to improve a mount characteristic of the multilayer electronic component. The plating layer 131b or 132b is not limited to a particular type, may include at least one of nickel (Ni), tin (Sn), palladium (Pd) and an alloy thereof, or may include a plurality of layers.

As a more specific example of the plating layer 131b or 132b, the plating layer 131b or 132b may include a nickel (Ni) plating layer or a tin (Sn) plating layer, may include the Ni plating layer and the Sn plating layer sequentially formed on the electrode layer 131a or 132a, or may include the Sn plating layer, the Ni plating layer and the Sn plating layer sequentially formed on the electrode layer 131a or 132a. Alternatively, the plating layer 131b or 132b may include the plurality of Ni plating layers and/or the plurality of Sn plating layers.

The multilayer electronic component 100 may not need to be limited to a particular size.

However, in order for the multilayer electronic component to have the smaller size and simultaneously have the higher capacitance, it is necessary to increase the number of stacks by allowing the dielectric layer and the internal electrode to each have a reduced thickness. The multilayer electronic component 100 having a size of 0402 (i.e. length× width of 0.4 mm×0.2 mm) or less may thus have more remarkably improved reliability according to the present disclosure.

Therefore, in consideration of a manufacturing error, a size of the external electrode and the like, when having the length of 0.44 mm or less and the width of 0.22 mm or less, the multilayer electronic component 100 may have the more remarkably improved reliability according to the present disclosure. Here, the length of the multilayer electronic component 100 may indicate a maximum size of the multilayer electronic component 100 in the second direction, and the width of the multilayer electronic component 100 may indicate a maximum size of the multilayer electronic component 100 in the third direction.

Hereinafter, the present disclosure is described in more detail based on an example. However, it needs to be noted that the following example is provided only to explain the present disclosure by way of example, and not to limit a scope of the present disclosure. The reason is that the scope of the present disclosure is determined by a matter described in the claims and a matter reasonably inferred therefrom.

EXAMPLE

Manufactured is a sample capacitor including an internal electrode which satisfies an indium (In) content X in the surface layer portion of the internal electrode, an indium (In) content Y in the central portion of the internal electrode, and an indium (In) content Z in the dielectric layer, as described in Table 1 below, by adjusting a content of a nickel (Ni) powder and a content of an indium (In) powder, included in a paste for an internal electrode, and adjusting the oxygen partial pressure condition. The sample capacitor is manufactured by being fired for 10 minutes while precisely controlling the oxygen partial pressure condition to about $10^{-9}$ to $10^{-10}$ atm.

Here, the sample capacitor is sliced for analysis by using a micro-sampling method, i.e. focused ion beam (FIB), based on a cross section of the sample capacitor cut in the first-third (W-T) direction with respect to a 1/2 point of the capacitor in the second direction, the sliced sample for analysis is then observed using the STEM, and X, Y and Z respectively indicate average values of the indium (In) contents obtained from any four internal electrodes of this sample for analysis.

The interface between the dielectric layer and the internal electrode is a portion where the dielectric layer and the internal electrode are in contact with each other, and is set as a middle portion between a portion where a barium (Ba) content is rapidly reduced from the dielectric layer and converges to zero and a portion where the nickel (Ni) content is rapidly reduced from the internal electrode and converges to zero, by line mapping.

To obtain the indium (In) content compared to the nickel (Ni) and indium (In) contents in the surface layer portion of the internal electrode, measured is the indium (In) content (at %) "X" compared to the indium (In) and nickel (Ni) contents of the internal electrode at the point spaced apart from the interface of the internal electrode and the dielectric layer by 3 nm in the first direction. In detail, to obtain an X value, performed is a quantitative analysis of indium (In) and nickel (Ni) at five equally spaced points per one internal electrode, by using the EDS, based on the point spaced apart from the interface of the internal electrode and the dielectric layer by 3 nm in the first direction (i.e. depth direction), and the X values obtained from twenty points measured in a total of the four internal electrodes are averaged and shown in Table 1 below.

To obtain the indium (In) compared to the nickel (Ni) and indium (In) contents in the central portion of the internal electrode, the indium (In) content (at %) "Y" compared to the indium (In) and nickel (Ni) contents, is measured at the center of the internal electrode in the first direction. In detail, to obtain a Y value, performed is a quantitative analysis of indium (In) and nickel (Ni) at five equally spaced points per one internal electrode positioned at the center of the internal electrode in the thickness direction (first direction), and the Y values obtained from twenty points measured in the total of the four internal electrodes are averaged and shown in Table 1 below.

In addition, to obtain the indium (In) content compared to the titanium (Ti) content in the dielectric layer, the nickel (Ni) content (at %) "Z" compared to titanium (Ti) content is measured at the center of the dielectric layer in the first direction. In detail, to obtain a Z value, performed is a quantitative analysis of titanium (Ti) and indium (In) at five equally spaced points per one dielectric layer positioned at the center of the dielectric layer in the thickness direction (first direction), and the Z values obtained from twenty points measured in the total of the four dielectric layers are averaged and shown in Table 1 below.

Here, the capacitance and mean time to failure (MTTF) of each sample capacitor are measured and the capacitance and MTTF of Test No. 1 have reference values.

In detail, the capacitance of the capacitor is measured using an LCR meter at 1 KHZ and AC 0.5 V. The capacitance of Test No. 1 is shown to have the reference value 1, the other Test No. 2 through 10 have relative values.

In addition, the MTTF of the capacitor is measured by performing a high-temperature load test under conditions of 125° C. and 8 V for 400 samples per each test. Here, the time when an insulation resistance becomes 10 kQ or less is set as fixed time, and the capacitance of Test No. 1 has the reference value 1, the other Test No. 2 through 10 have relative values.

TABLE 1

| Test No. | X | Y | Z | Capacitance | MTTF |
|---|---|---|---|---|---|
| 1 | 0 | 0 | 0 | 1 | 1 |
| 2 | 0.41 | 0.36 | 0.3 | 1.03 | 0.97 |
| 4 | 0.46 | 0.41 | 0.7 | 1.18 | 1.24 |
| 5 | 0.67 | 0.41 | 1.3 | 1.32 | 1.43 |
| 6 | 0.88 | 0.46 | 1.8 | 1.24 | 1.73 |
| 7 | 0.98 | 0.51 | 2.5 | 1.25 | 1.51 |
| 8 | 1.08 | 0.57 | 3.1 | 1.17 | 1.28 |
| 9 | 1.14 | 0.62 | 3.3 | 0.94 | 1.05 |
| 10 | 1.24 | 0.72 | 3.4 | 0.82 | 0.92 |

As may be seen from experimental results in Table 1, Test No. 1 is a case where the internal electrode does not include indium (In), and it is confirmed that the capacitor has the capacitance and the MTTF each having a slightly low value of 1.

Meanwhile, Test No. 2 is a case where even though the internal electrode includes indium (In), less than 0.46 at&  is a range of the indium (In) content compared to the nickel (Ni) and indium (In) contents in the surface layer portion of the internal electrode, set in the present disclosure, and it is thus confirmed that the capacitor has a low MTTF value and the lower reliability.

In addition, Test Nos. 9 and 10 are cases where more than 1.08 at& is a range of the indium (In) content compared to the nickel (Ni) and indium (In) contents in the surface layer portion of the internal electrode, set in the present disclosure, and it is thus confirmed that the capacitor has somewhat lower capacitance. In particular, Test No. 10 is a case where the indium (In) content compared to the nickel (Ni) and indium (In) contents in the surface layer portion of the internal electrode fails to be in a range of 0.41 to 0.62 at %, and it is thus confirmed that the capacitor has not only the lower capacitance but also the lower MTTF, and thus the lower reliability.

On the other hand, Test Nos. 4 through 8 are cases where 0.46 to 1.08 at % is a range of the indium (In) content compared to the nickel (Ni) and indium (In) contents in the surface layer portion of the internal electrode, set in the present disclosure, and it is thus confirmed that the capacitor has the excellent capacitance and higher MTTF value than Test No. 1, and thus has higher reliability. Here, Test Nos. 4 through 8 are cases where 0.41 to 0.62 at % is a range of the indium (In) content compared to the nickel (Ni) and indium (In) contents in the central portion of the internal electrode, and it is also confirmed that 0.41 to 0.62 at % is a range of the indium (In) content compared to the nickel (Ni) and indium (In) contents in the central portion of the internal electrode.

Figure 7:
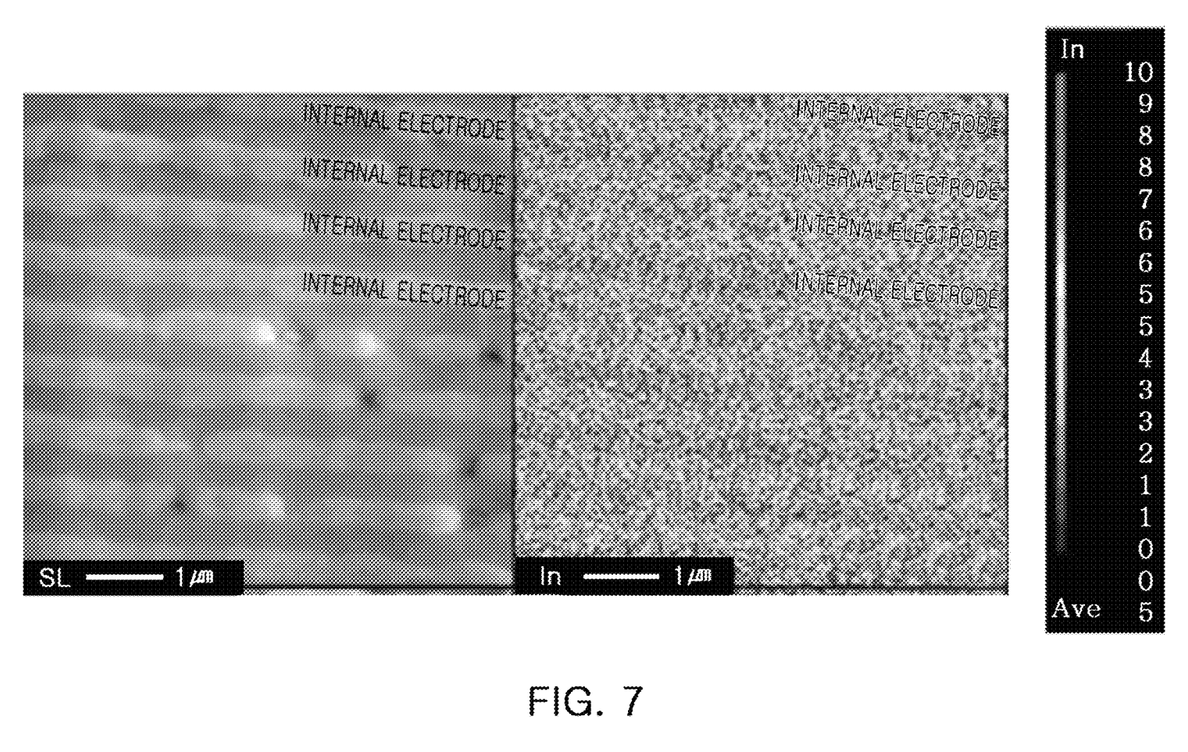
FIG. 7 shows an image obtained by capturing a cross section of a body in a sample of the multilayer electronic component, obtained from Test No. 4 which is an exemplary embodiment of the present disclosure, by using a scanning electron microscope (SEM) and a result of analyzing an Indium (In) component distributed in the image by using an electron probe x-ray micro analyzer (EPMA).

Meanwhile, as an example, FIG. 7 shows an image obtained by capturing the cross section of the body in the first-third direction in the sample capacitor of the multilayer electronic component, obtained from Test No. 4, by using the scanning electron microscope (SEM) and a result of analyzing the Indium (In) component distributed in the image by using an electron probe x-ray micro analyzer (EPMA).

As set forth above, the present disclosure may provide the multilayer electronic component having the higher reliability by including the internal electrode which includes a specific amount of indium (In) or more.

The present disclosure may also provide the multilayer electronic component having the improved mean time to failure (MTTF).

The present disclosure may also provide the reliable multilayer electronic component having the smaller size and the higher capacitance.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including (i) a dielectric layer and (ii) an internal electrode including a first internal electrode and a second internal electrode that are alternately disposed with the dielectric layer interposed therebetween in a first direction; and
an external electrode disposed on the body and connected to the internal electrode,
wherein 0.46 to 1.08 at % is a range of an indium (In) content compared to nickel (Ni) and indium (In) contents in a surface layer portion of the internal electrode.

2. The multilayer electronic component of claim 1, wherein 0.41 to 0.62 at % is a range of the indium (In) content compared to the nickel (Ni) and indium (In) contents in a central portion of the internal electrode.

3. The multilayer electronic component of claim 2, wherein the indium (In) content in the central portion of the internal electrode is less than the indium (In) content in the surface layer portion.

4. The multilayer electronic component of claim 1, wherein the dielectric layer includes indium (In).

5. The multilayer electronic component of claim 4, wherein the indium (In) content in the dielectric layer is greater than the indium (In) content in the internal electrode.

6. The multilayer electronic component of claim 2, wherein the central portion of the internal electrode indicates a region thereof within +30% in the first direction, based on a center (i.e. 1/2t point) of the internal electrode with respect to a thickness "t" thereof, and
the surface layer portion of the internal electrode indicates a region other than the central portion of the internal electrode.

7. The multilayer electronic component of claim 1, wherein 0.3 to 3.3 at % is a range of the indium (In) content compared to a titanium (Ti) content in the dielectric layer.

8. The multilayer electronic component of claim 1, wherein 100 nm to 1.5 μm is a range of an average thickness of the internal electrode.

9. The multilayer electronic component of claim 1, wherein 200 nm to 4 μm is a range of an average thickness of the dielectric layer.

10. The multilayer electronic component of claim 1, wherein Y<X in which "X" indicates the indium (In) content compared to the indium (In) and nickel (Ni) contents of the internal electrode, measured at a point spaced apart from an interface of the internal electrode and the dielectric layer by 3 nm in the first direction, and "Y" indicates the indium (In) content compared to the indium (In) and nickel (Ni) contents measured at a center of the internal electrode in the first direction.

11. The multilayer electronic component of claim 1, wherein Y<Z in which "Y" indicates the indium (In) content compared to the indium (In) and nickel (Ni) contents measured at a center of the internal electrode in the first direction, and "Z" indicates the indium (In) content compared to a titanium (Ti) content measured in a center of the dielectric layer in the first direction.

12. The multilayer electronic component of claim 1, wherein X<Z in which "X" indicates the indium (In) content compared to the indium (In) and nickel (Ni) contents of the internal electrode, measured at a point spaced apart from an interface of the internal electrode and the dielectric layer by 3 nm in the first direction, and "Z" indicates the indium (In) content compared to a titanium (Ti) content measured in a center of the dielectric layer in the first direction.

13. A multilayer electronic component comprising:
a body including (i) a dielectric layer and (ii) an internal electrode including a first internal electrode and a second internal electrode that are alternately disposed with the dielectric layer interposed therebetween in a first direction, wherein in the dielectric layer, an indium (In) content is more than 0.3 and not more than 3.3 at % based on a titanium (Ti) content, and Y<Z in which "Y" indicates the indium (In) content compared to the indium (In) and nickel (Ni) contents measured at a center of the internal electrode in the first direction, and "Z" indicates the indium (In) content compared to a titanium (Ti) content measured in a center of the dielectric layer in the first direction; and
an external electrode disposed on the body and connected to the internal electrode.

14. The multilayer electronic component of claim 13, wherein in the dielectric layer, the indium (In) content is 0.7 to 3.3 at % based on the titanium (Ti) content.

15. The multilayer electronic component of claim 13, wherein in the dielectric layer, the indium (In) content is more than 0.7 and less than 3.3 at % based on the titanium (Ti) content.

16. The multilayer electronic component of claim 13, wherein in the dielectric layer, the indium (In) content is 1.3 to 2.5 at % based on the titanium (Ti) content.

17. The multilayer electronic component of claim 13, wherein in a surface layer portion of the internal electrode, an indium (In) content is 0.46 to 1.08 at % based on nickel (Ni) and indium (In) contents.

18. The multilayer electronic component of claim 17, wherein in the surface layer portion of the internal electrode, the indium (In) content is more than 0.46 and less than 1.08 at % based on the nickel (Ni) and indium (In) contents.

19. The multilayer electronic component of claim 17, wherein in the surface layer portion of the internal electrode, the indium (In) content is 0.67 to 0.98 at % based on the nickel (Ni) and indium (In) contents.

20. The multilayer electronic component of claim 13, wherein in a central portion of the internal electrode, an indium (In) content is 0.41 to 0.62 at % based on nickel (Ni) and indium (In) contents.

21. The multilayer electronic component of claim 20, wherein in the central portion of the internal electrode, the indium (In) content is more than 0.41 and less than 0.62 at % based on the nickel (Ni) and indium (In) contents.

22. The multilayer electronic component of claim 20, in the central portion of the internal electrode, the indium (In) content is more than 0.41 and less than 0.57 at % based on the nickel (Ni) and indium (In) contents.

* * * * *